(12) United States Patent
Becker

(10) Patent No.: US 7,669,465 B2
(45) Date of Patent: *Mar. 2, 2010

(54) SYSTEMS AND METHODS FOR MAINTAINING AIR PRESSURE IN TIRES

(76) Inventor: John Becker, 15 B Bowens Ct., Cartersville, GA (US) 30120

( * ) Notice: Subject to any disclaimer, the term of this patent is extended or adjusted under 35 U.S.C. 154(b) by 428 days.

This patent is subject to a terminal disclaimer.

(21) Appl. No.: 11/353,619

(22) Filed: Feb. 14, 2006

(65) Prior Publication Data

US 2006/0179929 A1  Aug. 17, 2006

Related U.S. Application Data

(63) Continuation-in-part of application No. 10/408,815, filed on Apr. 7, 2003.

(60) Provisional application No. 60/371,305, filed on Apr. 10, 2002, provisional application No. 60/652,544, filed on Feb. 14, 2005.

(51) Int. Cl.
 *B60C 23/02* (2006.01)
(52) U.S. Cl. ..................... 73/146.8; 152/417
(58) Field of Classification Search ............. 73/146; 152/417
See application file for complete search history.

(56) References Cited

U.S. PATENT DOCUMENTS

| | | | | |
|---|---|---|---|---|
| 3,276,503 A | * | 10/1966 | Kilmarx | 152/417 |
| 4,387,931 A | * | 6/1983 | Bland | 303/1 |
| 4,685,501 A | * | 8/1987 | Williams | 152/417 |
| 4,883,106 A | * | 11/1989 | Schultz et al. | 152/417 |
| 5,287,906 A | * | 2/1994 | Stech | 152/417 |
| 5,505,080 A | | 4/1996 | McGhee | 73/146.5 |
| 5,584,949 A | * | 12/1996 | Ingram | 152/417 |
| 5,941,692 A | * | 8/1999 | Olney et al. | 417/233 |
| 6,244,316 B1 | * | 6/2001 | Naedler | 152/417 |
| 6,585,019 B1 | * | 7/2003 | Ingram | 152/417 |
| 6,715,355 B2 | | 4/2004 | Vile et al. | 73/702 |
| 6,968,882 B2 | | 11/2005 | Ingram | 152/417 |
| 7,124,789 B2 | * | 10/2006 | Nakano | 141/38 |

* cited by examiner

*Primary Examiner*—Andre J Allen
(74) *Attorney, Agent, or Firm*—Jones IP Law, LLC

(57) ABSTRACT

A system for air injection into tires, comprising a rotary air chamber secured to a hub cap wherein the rotary air chamber is configured to inject air into at least one tire when tire pressure drops below a first adjustable preset value and to release air from the at least one tire when tire pressure rises above a second adjustable preset value, an air shaft extending through the hub cap and into the rotary air chamber, an air line attached to the air shaft, and ball bearings affixed between the air shaft and the hub cap. A bracket can be fastened to the hub cap such that the rotary air chamber is fastened to the bracket. The hub cap and air shaft are fastened to the axle such that an air line extends from inside the axle through the air shaft to the rotary air chamber.

19 Claims, 6 Drawing Sheets

SYSTEMS AND METHODS FOR MAINTAINING AIR PRESSURE IN TIRES

CROSS REFERENCE TO RELATED APPLICATION

This application is a continuation-in-part of U.S. application Ser. No. 10/408,815, filed on Apr. 7, 2003, entitled "Tire Inflation System," which is entirely incorporated herein by reference, which claims priority to Provisional Application No. 60/371,305, filed on Apr. 10, 2002. This application also claims the benefit of U.S. provisional application entitled, "Trailer Axle—Tire Inflation System", having Ser. No. 60/652,544 filed Feb. 14, 2005, which is entirely incorporated herein by reference.

TECHNICAL FIELD

Various embodiments are generally related to over the road trailers and, more particularly, are related to systems and methods for maintaining correct air pressure in various type trailer tires.

BACKGROUND

Over 7 million trailers haul 94% of the nation's cargo transporting items as diverse as fresh fruit, computers, steel, flowers, cattle, plastic, oil, compressed gas, US Mail and more. Other trailer classifications are dry bulk, reefers (refrigerated) and tankers, dry and liquid. Many trailers are now used as warehouses on wheels, often waiting several days and tires can loose air pressure in any number of ways.

Tires in most trailers normally operate at approximately 100 psi. However, traveling through hot climates such as the Arizona desert can cause the pressure in the tires to increase to dangerous levels increasing likelihood of a blow-out or other catastrophic failure. Traveling through mountainous terrain increases tire wear dramatically. Oil tankers that require proportionately more turning also increases wear on the tires. Additionally, improper air pressure significantly reduces the life of tires, as much as 50% in many cases.

A typical long haul trailer will experience tire pressure loss of up to 10% psi per week causing accelerated tire wear of 20-30%. Additionally the under inflated tires cause up to a 5.8% increase in fuel consumption. It has been estimated that over 20 million tires are damaged annually due to road hazards such as fallen bolts from other units, large pot holes, washboard interstates and railway tracks. The rubber compound that makes up the tire will also leak air over time.

The three largest operating costs associated with transporting goods are fuel, salaries of drivers, and tires. It has been estimated that tire failures account for more than 50% of all road cost. Air injection directly into trailer tires while traveling at high speed has been available only via cumbersome and cost prohibitive measures such as using a separate air compressor or pressurizing axles, for example. Maintaining correct air pressure in trailer tires could significantly reduce costs associated with transporting goods, by extending tire life up to 80%. Consequently, systems and methods are needed for maintaining the correct air pressure in trailer tires.

SUMMARY

Systems and methods for injecting air into tires for various over the road trailers are disclosed. Briefly described, one embodiment is a system comprising a rotary air chamber secured to a hub cap wherein the rotary air chamber is configured to inject air into at least one tire when tire air pressure drops below a first adjustable preset value and to release air from the at least one tire when tire air pressure rises above a second adjustable preset value, an air shaft extending through the hub cap and into the rotary air chamber, an air line attached to the air shaft, and ball bearings affixed between the air shaft and the hub cap. The hub cap and air shaft are fastened to the axle such that an air line extends from inside the axle to the air shaft and the air shaft extends into the rotary air chamber.

Another embodiment is a method comprising causing air to flow through an air line running through an axle, the air flow continuing through an air shaft into a rotary air chamber secured to a hub cap, injecting air into at least one tire when a check valve in the rotary air chamber indicates that tire pressure drops below a first preset value, and releasing air from the at least one tire when a relief valve in the rotary air chamber indicates that tire pressure rises above a second preset value.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the current invention. Moreover, in the drawings, like reference numerals designate corresponding parts throughout the several views.

DETAILED DESCRIPTION

Figure 1:
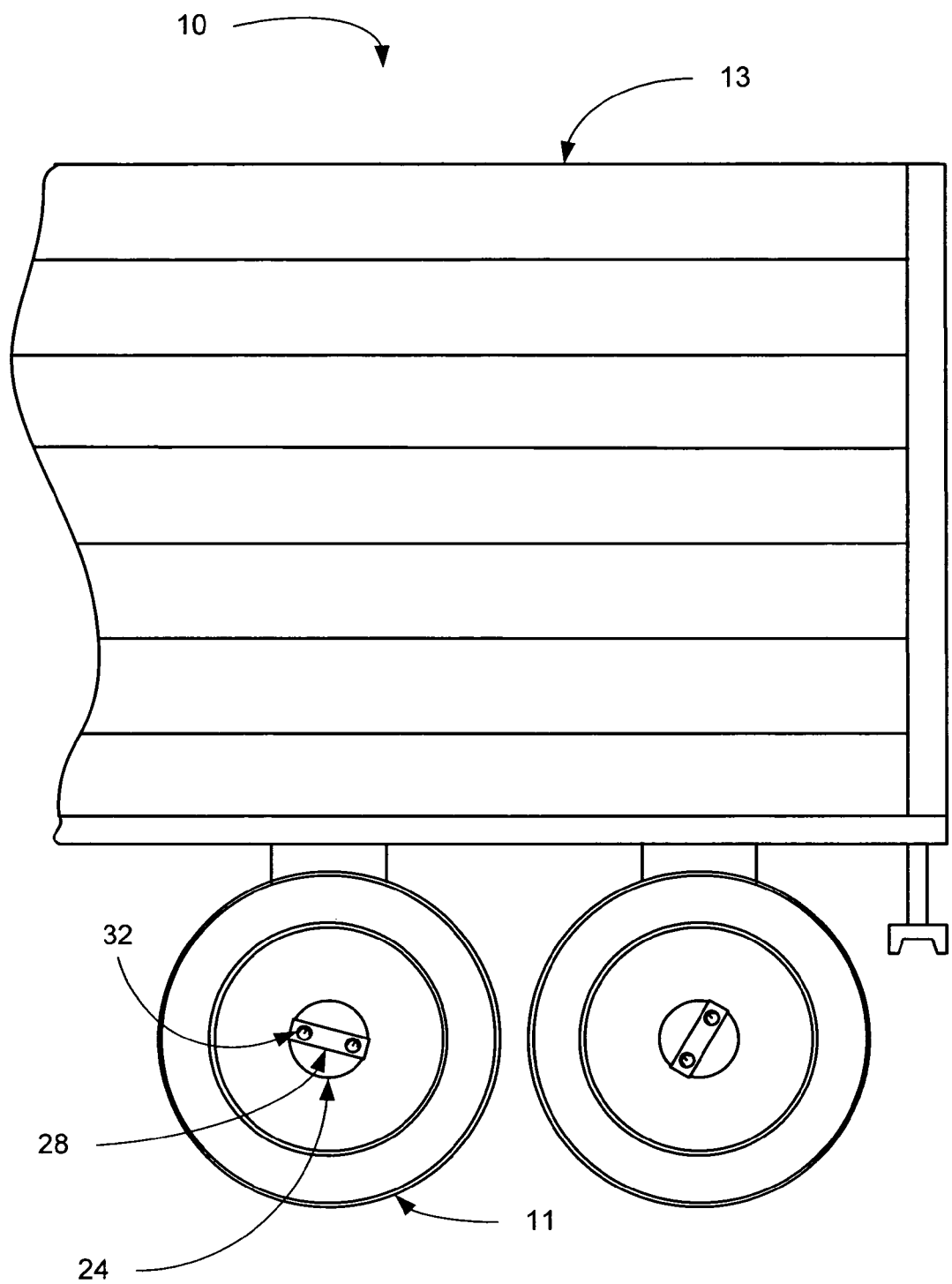
FIG. 1 is an illustration of the tire inflation system affixed to the hub cap of a trailer.

FIG. 1 illustrates an embodiment of the tire inflation system 10 for a trailer axle on a trailer 13. The rotary air chamber 28 of a tire inflation system 10 is shown affixed to a hub cap 24 of a tire 11. Two pressure gauges 32 indicate the current pressure for both the outermost tire 11 and the tire behind it. The tire inflation system 10 maintains the tire 11 pressure between adjustable predetermined values. Typically, the operating air pressure for tires 11 on a trailer 13 is maintained between 100 and 110 psi. For situations where the trailer 13 load requires different air pressures in the tires 11, the lower and upper values of the desired tire 11 air pressure range can be adjusted.

Figure 2:
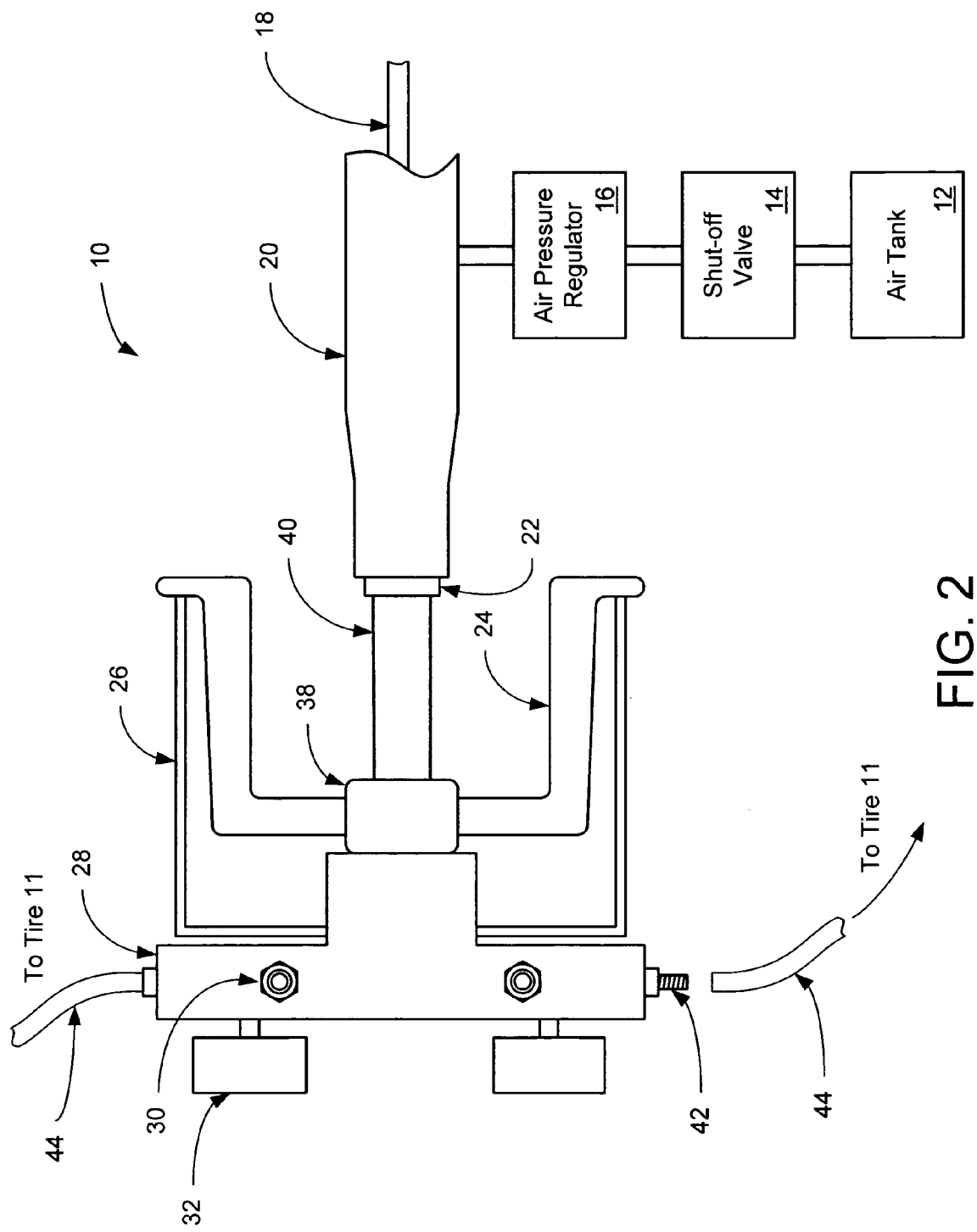
FIG. 2 is the tire inflation system of FIG. 1.

An embodiment of the tire inflation system 10 is shown in FIG. 2. A rotary air chamber 28 is fastened to a bracket 26. The bracket 26 is fastened to a hub cap 24. The hub cap 24 is fastened to the rim or wheel (not shown). An air shaft 40 extends from the axle 20 through the hub cap 24, the bracket 26 and into the rotary air chamber 28. High speed bearings 38 are affixed between the air shaft 40 and the hub cap 24. The air shaft 40 is inserted into the axle 20 via an axle plug 22, so that the air shaft 40 remains stationary, thus allowing air to flow through the passage while the wheel and the hub cap 24 rotate. As discussed further below, the rotary air chamber 28 also contains high speed bearings between the rotary chamber 28 and the air shaft 40. Two pressure gauges 32 allow visual inspection of the operating air pressure in the tires. Fittings 42 on either end of the rotary air chamber 28 allow for connection to tires 11 (see FIG. 1) through air hoses 44. Two pressure relief valves 30 will release air pressure from the respective tire 11 when the tire 11 air pressure exceeds a preset upper limit. As a non-limiting example, the tire 11 air pressure could exceed the preset upper limit during hot weather. This preset upper limit may be adjusted to accommodate changing load and temperature conditions.

Air pressure flows to the tire 11 from a pressurized air tank 12 through an air line 18. A shut off valve 14 and an air pressure regulator 16 are inserted into the air line 18 between the air tank 12 and the axle 20. The pressurized air tank 12 is typically available to service air brakes and other similar equipment on the tractor and/or trailer. The air pressure regulator 16 sets the desired pressure for the tire inflation system 10 independently of other air pressure systems that may be present. As a non-limiting example, if it is desired to operate the tires 11 at 100 psi, then the air pressure regulator 16 is set for 100 psi. Air pressure will then flow through the air line 18 at 100 psi. The air line 18 extends through the axle 20 and continues to the air shaft 40. The air shaft 40 extends through the hub cap 24 and the bracket 26 and into the rotary air chamber 28. Of course, the air line 18 may extend in both directions to air shafts 40 at both ends of the axle 20. It should be noted that the shut off valve 14 and the air pressure regulator 16 could be operated manually or remotely. Additionally, the shut off valve 14 and the air pressure regulator 16 could be operated automatically or could even be computer controlled.

The air flow for the tire inflation system 10 operates on a positive pressure if small leaks occur in a tire 11 as, in a non-limiting example, when a bolt or nail becomes stuck in the tire 11. The tire inflation system 10 will increase flow rate to maintain the predetermined tire pressure. Again, the predetermined air pressure may be changed by adjusting the air pressure regulator 16.

An alternative embodiment of the tire inflation system 10 would allow for adding a coolant such as nitrogen to the pressurized air. A coolant could be added to the pressurized air by, for example but not limited to, providing a fixed bleed into the air line 18.

Figure 3:
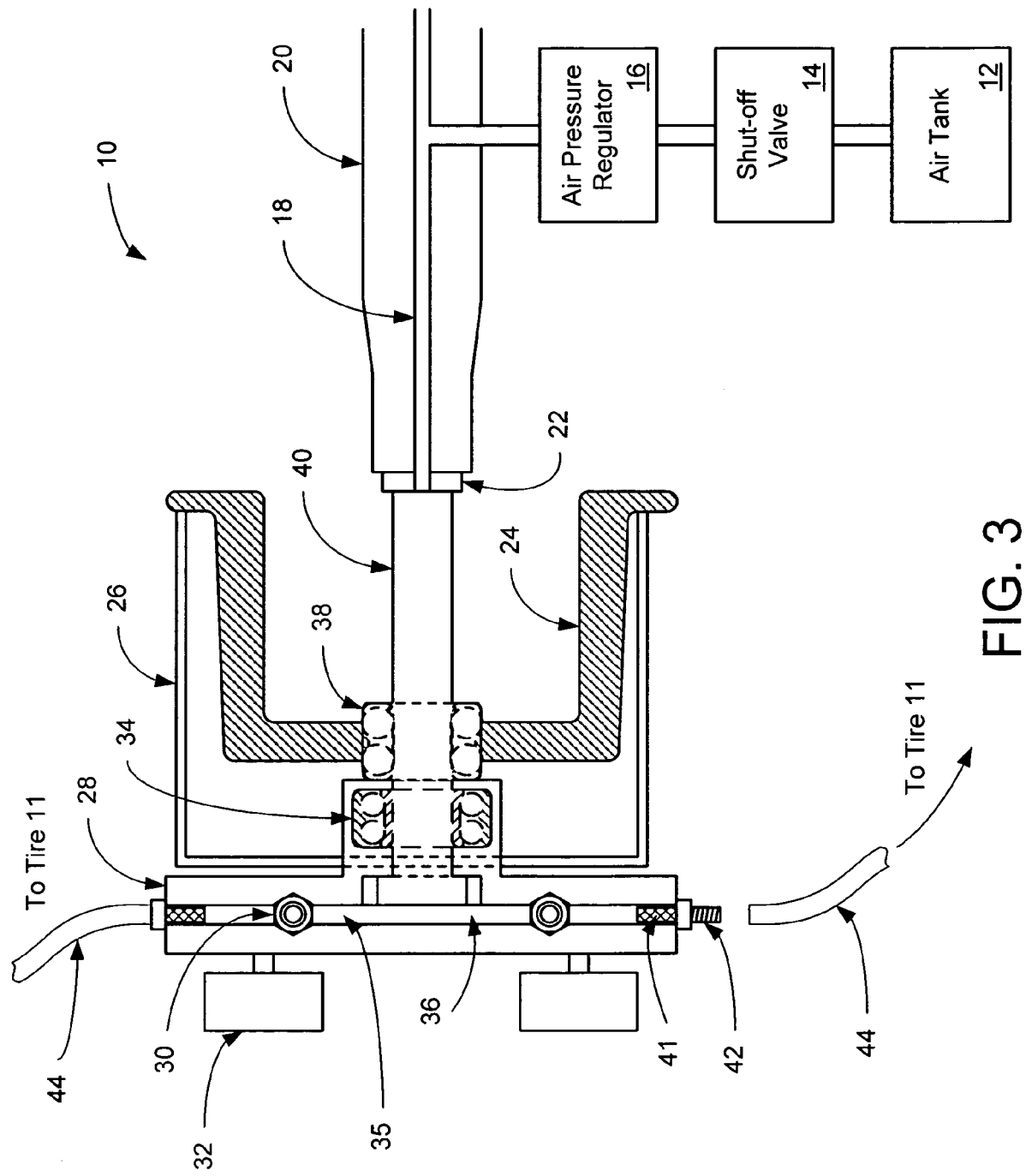
FIG. 3 is a cut-away view of the tire inflation system of FIG. 1.

Further details of the tire inflation system 10 are illustrated in FIG. 3. As noted above, the air line 18 extends through the axle 20 and continues to the air shaft 40. The air shaft 40 extends through the hub cap 24, the bracket 26 and into the rotary air chamber 28. High speed bearings 38 are affixed between the air shaft 40 and the hub cap 24. Additionally, the rotary air chamber 28 has high speed bearings 34 affixed between the inside of the rotary air chamber 28 and the air shaft 40. Thus, the air shaft 40 remains stationary while the hub cap 24, the bracket 26 and the rotary air chamber 28 rotate with the wheel and tire 11. Air flows through the air line 18 into an air chamber 35 inside the rotary air chamber 28. A high pressure air seal 36 is affixed between the air line 18 and the air chamber 35.

Pressure relief valves 30 operate to release air pressure from the tires 11 when the tire 11 air pressure exceeds an adjustable predetermined value. The predetermined value may be set for an appropriate maximum tire 11 air pressure dependent upon weather and/or load conditions. Check valves 41 operate to cause air to flow into the tires 11 when the tire 11 air pressure drops below the desired pressure as set by the air pressure regulator 16. Additionally, the check valves 41 operate to prevent loss of pressure in one tire 11 in the event of a catastrophic failure of the other tire, as in for example a blow-out. If the check valve 41 detects an increased air flow rate, it will close off air flow through the check valve 41. The check valve 41 will prevent air from flowing back into the air chamber 35 from the still operable tire 11 in an attempt to equalize the pressure with the failed tire.

The rotary air chamber 28 prevents trailer tires from loosing air pressure due to "non air back flow technology." The rotary air chamber 28 causes air transfer to each tire 11 as needed. As the tire 11 air pressure increases to unsafe levels, air is released via the relief valves 30. A pressure gauge 32 corresponds to each tire and the rotary air chamber 28 is equipped with a non flow-back check valve 41, which also prevents air flow from one tire to another due to catastrophic failure of a tire. The rotary air chamber 28 also includes auxiliary inlet air fill valves (not shown) through which nitrogen or other coolants can be introduced if desired.

Figure 4:
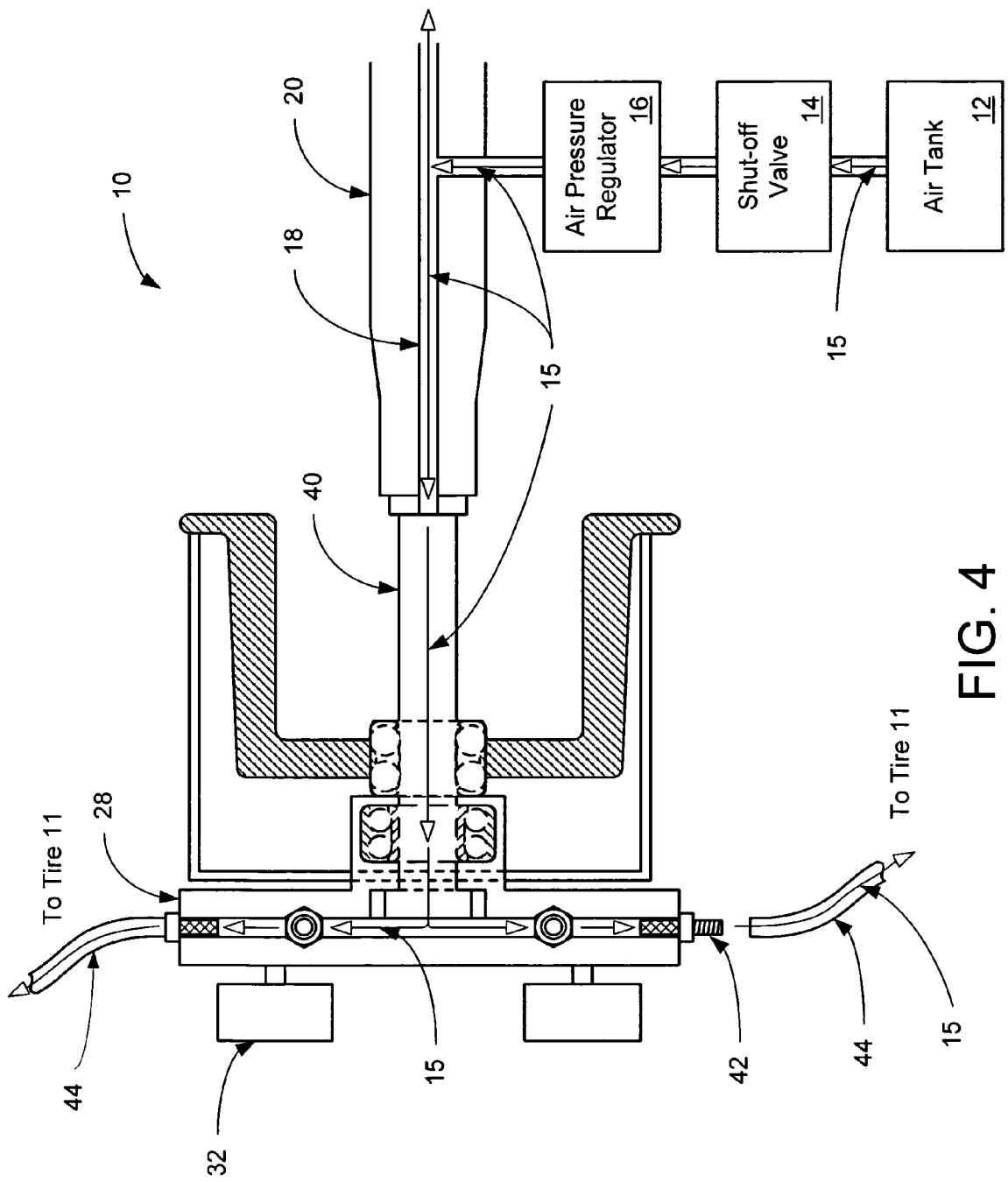
FIG. 4 is an illustration of air flow through the tire inflation system of FIG. 3.

Arrows representing air flow 15 in FIG. 4 illustrate the passage of air through the tire inflation system 10. Air flows from the air tank 12 through the air line 18. Typically a shut off valve 14 and an air pressure regulator 16 are present in the air line 18 between the air tank 12 and the axle 20. Air flow 15 continues through the air line 18 to the end of the axle 20, and then continues through the air shaft 40 and into the rotary air chamber 28. Air hoses 44 are connected to the fittings 42 on either end of the rotary air chamber and air flow 15 continues through the air hoses 44 to the tires 11.

Figure 5:
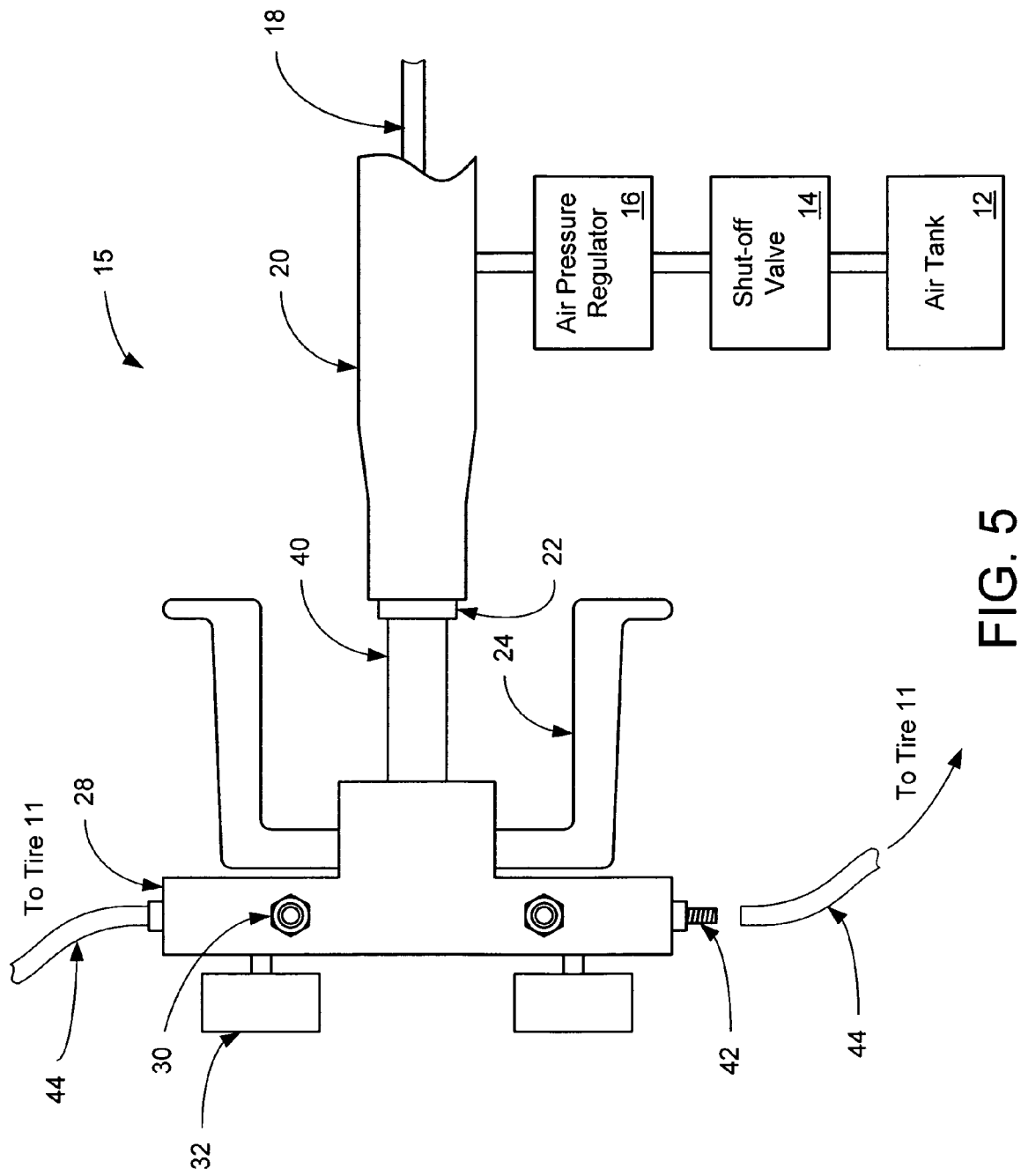
FIG. 5 is a tire inflation system of FIG. 1 fastened directly to the hub cap of a trailer.

An alternative embodiment of the tire inflation system 15 allows the rotary air chamber 28 to be secured directly to the hub cap 24 as shown in FIG. 5. The intervening bracket is not used in this embodiment. Aside from the bracket not being present the tire inflation system 15 operates as in previous embodiments. As noted above, the air line 18 extends through the axle 20 and continues to the air shaft 40. The air shaft 40 extends through the hub cap 24 and into the rotary air chamber 28. The high speed bearings 34 (not shown in FIG. 4, see FIG. 3) are affixed between the inside of rotary air chamber 28 and the air shaft 40, such that the air shaft 40, which is secured to the axle 20 via an axle plug 22, remains stationary while the hub cap 24 and the rotary air chamber 28 rotate with the wheel and tire 11.

Pressure relief valves 30 operate to release air pressure from the tires 11 when the tire 11 air pressure exceeds an adjustable predetermined value. The predetermined value may be set for an appropriate maximum tire 11 air pressure dependent upon weather and/or load conditions. Check valves 41 (not shown, see FIG. 3) operate to cause air to flow into the tires 11 when the tire 11 air pressure drops below the desired pressure as set by the air pressure regulator 16. As above, the check valves 41 operate to prevent loss of pressure in one tire 11 in the event of a catastrophic failure of the other tire, as in for example a blow-out. The check valve 41 and air seal 36 prevent air from flowing back into the air chamber 35 (not shown, see FIG. 3) of the rotary air chamber 28 from the still operable tire 11 in an attempt to equalize the pressure with the failed tire.

It should be noted that the pressure gauges 32, as shown in FIG. 2, FIG. 3, FIG. 4 and FIG. 5 could include sensors and/or transmitters equipped to indicate the air pressure in tire 11. The transmitter could send tire 11 air pressure to a monitoring system in a vehicle or to other wireless connection points and could thus provide air pressure measurements to the monitoring system. In this way the driver could monitor the tire 11 air pressure from inside the vehicle.

Figure 6:
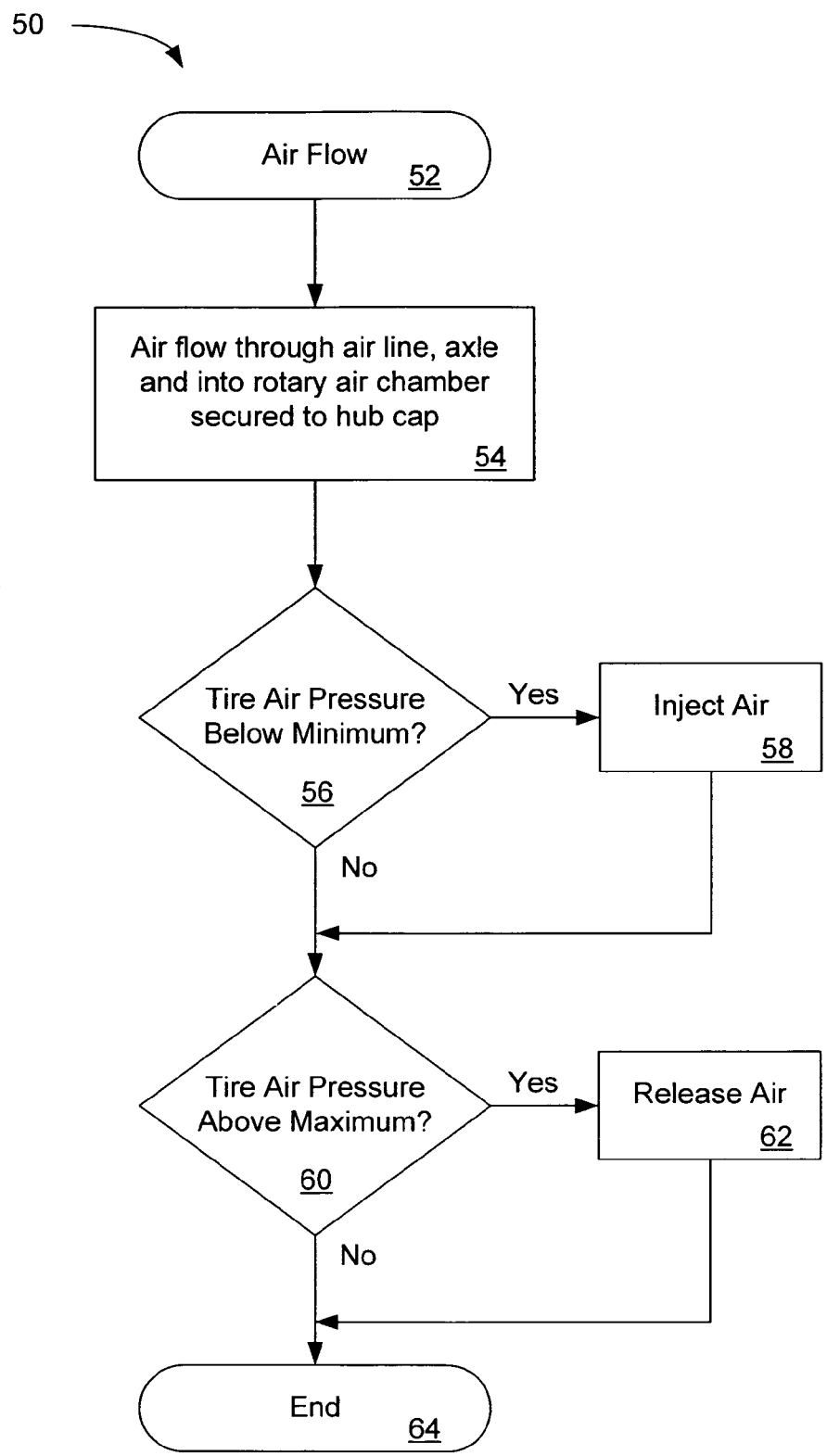
FIG. 6 is a flowchart illustrating an embodiment of a process for maintaining correct air pressure in trailer tires.

FIG. 6 shows a flowchart 50 illustrating the operation of the tire inflation system 10. Step 54 shows that the air flows through an air line, through the axle, and into a rotary air chamber secured to a hub cap. The tire inflation system continuously monitors the tire air pressure as in step 56. If the air pressure is below a predetermined minimum value, air is injected into the tire in step 58. The tire inflation system also continuously monitors the tire air pressure as in step 60. If the air pressure is above a predetermined maximum value, air is released from the tires in step 62. The nature of steps 56 and 60 is such that the order of the steps may be switched or occur simultaneously.

It should be emphasized that the above-described embodiments are merely examples of the disclosed system and method. Many variations and modifications may be made to the above-described embodiments. All such modifications and variations are intended to be included herein within the scope of this disclosure.

What is claimed is:

1. A system for continuously maintaining air pressure in tires, comprising:
   a rotary air chamber secured to a hub cap wherein the rotary air chamber includes a plurality of check valves, each check valve configured to inject air into a corresponding tire when tire air pressure drops below a first adjustable preset value, and a plurality of relief valves, each relief valve configured to release air from a corresponding tire when tire air pressure rises above a second adjustable preset value;
   an air shaft extending through the hub cap and into the rotary air chamber;
   an air line attached to the air shaft, so that the air line passes through an axle and injects air into the air shaft; and
   ball bearings affixed between the air shaft and the hub cap, so that the rotary air chamber rotates with the wheel.

2. The system of claim 1, further comprising a bracket fastened to the hub cap wherein the rotary air chamber is fastened to the bracket.

3. The system of claim 1, wherein the hub cap is fastened to the axle.

4. The system of claim 3, wherein the air shaft is secured to the axle.

5. The system of claim 1, wherein the rotary air chamber comprises:
   ball bearings separating the air shaft from the rotary chamber;
   an air chamber;
   an air seal affixed between the air shaft and the air chamber
   at least one pressure relief valve that can be configured to release air when a tire pressure rises above an adjustable preset value;
   at least one check valve that is configured to inject air into a tire when tire pressure drops below an adjustable preset value;
   at least one pressure gauge; and
   at least one fitting configured for connection to an air hose connecting to a tire.

6. The system of claim 5, wherein the check valve is further configured to close off air flow upon detecting an increase in air flow rate above a predetermined level.

7. The system of claim 5, wherein the pressure gauge further comprises a sensor capable of transmitting a signal indicating measured air pressure to a monitoring system.

8. The system of claim 1, further comprising an air tank connected to the air line.

9. The system of claim 8, further comprising that the air line is connected to at least one shut-off valve between the air tank and the rotary air chamber.

10. The system of claim 8, further comprising that the air line is connected to an air pressure regulator between the air tank and the rotary air chamber.

11. A method for air injection into at least one tire, comprising
    causing air to flow through an air line running through an axle, the air flow continuing through an air shaft into a rotary air chamber secured to a hub cap;
    injecting air into the at least one tire when a check valve in the rotary air chamber indicates that tire pressure drops below a first preset value; and
    releasing air from the at least one tire when a relief valve in the rotary air chamber indicates that tire pressure rises above a second preset value.

12. A system for air injection into a tire, comprising:
    means for causing air to flow through an air line within an axle;
    means for injecting the air into the tire when tire pressure drops below a first preset value; and
    means for releasing air from the tire when tire pressure rises above a second preset value.

13. The system of claim 12, wherein the causing means remains stationary when a tire fastened to the axle rotates.

14. The system of claim 12, wherein the injecting means is further configured for injecting air into a second tire when the second tire pressure drops below the first preset value and the releasing means is further configured for releasing air from the second tire when the second tire pressure rises above the second preset value.

15. The system of claim 12, wherein the injecting means rotates with the tire.

16. The system of claim 12, wherein the injecting means is a rotary air chamber.

17. The system of claim 12, wherein the releasing means is a rotary air chamber.

18. The system of claim 12, further comprising means for injecting an inert gas into at least one tire for cooling purposes.

19. The system of claim 18, wherein the inert gas is nitrogen.

* * * * *